United States Patent
Iffländer et al.

(10) Patent No.: US 7,117,166 B2
(45) Date of Patent: Oct. 3, 2006

(54) INDUSTRIAL EQUIPMENT SERVICES MARKETING AND SALE SYSTEM

(75) Inventors: Bernhard Iffländer, Weiden (DE); Marion Jouffroy, Nürnberg (DE); Nickolaus Hönig, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 729 days.

(21) Appl. No.: 09/774,462

(22) Filed: Jan. 31, 2001

(65) Prior Publication Data

US 2002/0103702 A1   Aug. 1, 2002

(51) Int. Cl.
   *G06Q 30/00*   (2006.01)
(52) U.S. Cl. .................................. 705/26
(58) Field of Classification Search ............ 705/26
   See application file for complete search history.

(56) References Cited

U.S. PATENT DOCUMENTS

| | | | |
|---|---|---|---|
| 6,938,006 B1 * | 8/2005 | Ikeda ................... | 705/27 |
| 2002/0103702 A1 * | 8/2002 | Ifflander et al. ......... | 705/14 |
| 2004/0030611 A1 * | 2/2004 | Byrne ................... | 705/26 |

FOREIGN PATENT DOCUMENTS

WO    WO 97/45796    * 12/1997

OTHER PUBLICATIONS

Conhaim, Wallys W., "Thomas Publishing", Link-Up, v. 15 n. 4, Jul./Aug. 1998:12(3).*
Edwardsinc.com, website www.edwardsinc.com published Oct. 8, 1999, accessed at http://www.waybackmachine.org/, Sep. 18, 2005.*
"GE Infrastructure—Centerline Installation and Refurbishment", web page downloaded on May 23, 2006 from http://www.gepower.com/prod_serv/serv_for/gas_steam_turbines/en/centerline/index.htm.*

* cited by examiner

*Primary Examiner*—Donald L. Champagne
(74) *Attorney, Agent, or Firm*—Baker Botts L.L.P.

(57) ABSTRACT

A plurality of services relating to either or both of the acquisition and use of industrial equipment, which can be quite bulky and is often expensive, are marketed (and may also be contracted for) by providing a mechanism for prospective and actual purchasers of industrial equipment, who visit an on-line marketplace where such equipment can be sold and purchased, to have on-line access to information generated by the provider(s) in response to purchaser requests. Relevant and valuable information relating to the request for and delivery of information are stored in a database for various purposes.

26 Claims, 10 Drawing Sheets

FIG. 4

REGISTER

REGISTER AS [          ]
COMPANY [          ]
DEPARTMENT [          ]
ADDRESS FORM ☐ MS ☐ MR
NAME [          ]
FIRST NAME [          ]
TITLE [          ]
POSITION [          ]
TELEPHONE [          ]
TELEFAX [          ]
E-MAIL [          ]
STREET AND NO. [          ]
(OR P.O.BOX)
POSTAL CODE [          ]
TOWN/CITY [          ]
COUNTRY [          ]
OTHER COUNTRY [          ]
(NOT IN LIST)

USER NAME [          ]
PASSWORD [          ]
CONFIRM [          ]
PASSWORD

☐ I HAVE READ THE TERMS OF BUSINESS AND AGREE
    TO THEM

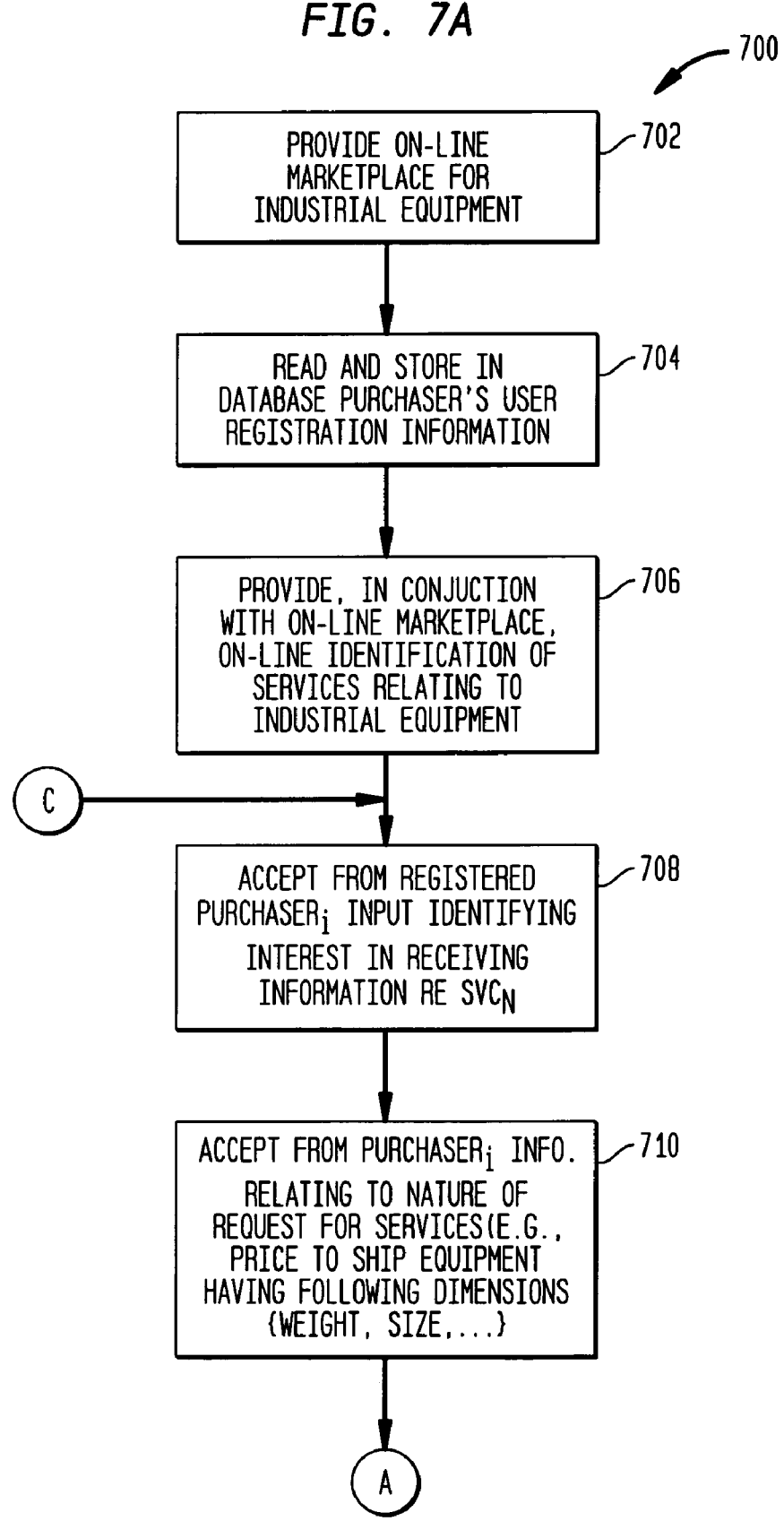

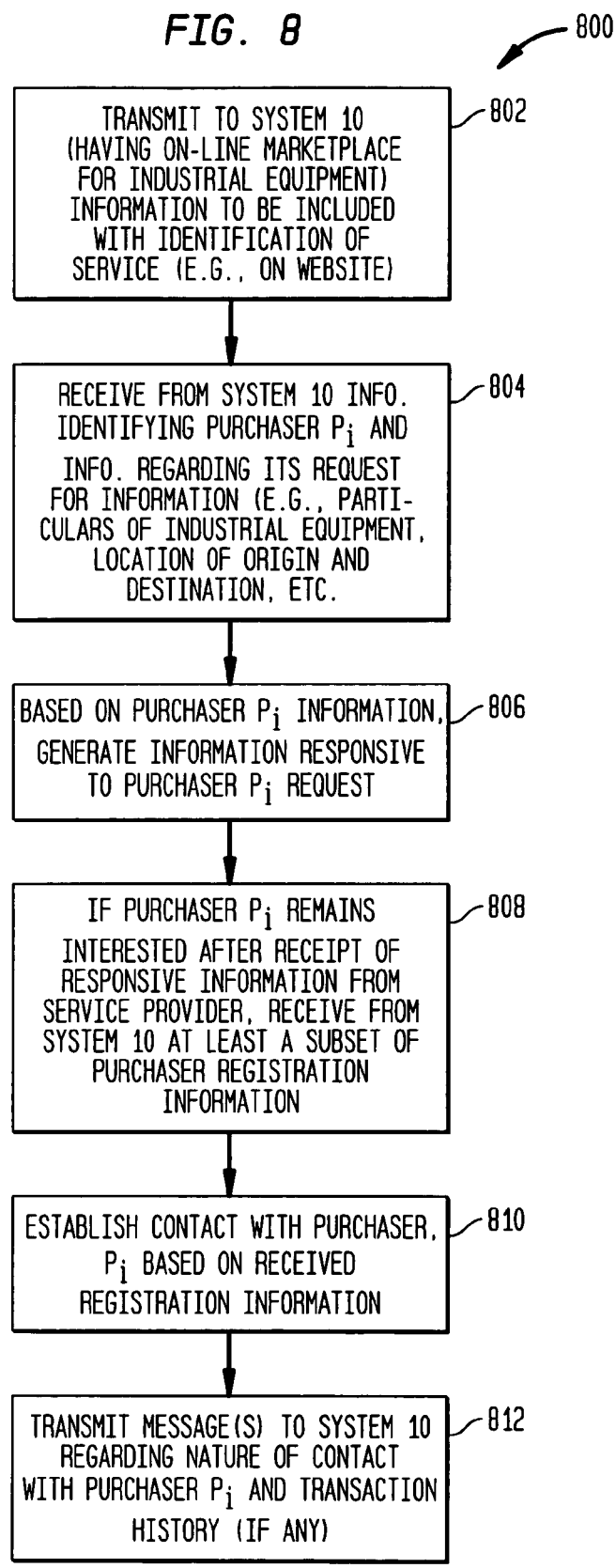

INDUSTRIAL EQUIPMENT SERVICES MARKETING AND SALE SYSTEM

FIELD OF THE INVENTION

The present invention relates to the field of industrial and automation equipment and, particularly, to a system and method for on-line marketing and sale of services relating to industrial equipment.

BACKGROUND OF THE INVENTION

A would-be purchaser of industrial equipment, especially large scale equipment, faces a series of hurdles including not only purchasing the equipment at a desired price, but also a host of other challenges, before the full benefit of the purchased equipment can be realized. Since industrial equipment is often costly, the purchaser may need financial assistance. Once financing has been arranged and the sale can be completed, the purchaser needs to worry about relocating the equipment from the seller's site to its own desired location. Relocation of a large piece of capital equipment may involve various types of logistics services, such as transport management, shipment, export handling, freight calculation or other services. In addition, even after the equipment has been located, the purchaser may require on-call maintenance service, instrumentation and tool service, or still other services. Locating and coordinating such services, however, may be difficult and time consuming propositions.

It is necessary not only to arrange and negotiate for the delivery of each such service, but the services must themselves be financed and coordinated. Especially when the equipment desired to be purchased is offered for sale by an entity that is not a dealer in such goods, each such step presents a significant undertaking for which the seller may be unable to offer any assistance. As a result, prospective and actual purchasers of industrial equipment may be hampered, in turn putting a potential damper on the conduct of transactions in industrial equipment, which may not occur as readily as they otherwise would if there were a partial or complete solution to the problem of identifying and coordinating services incident to the purchase of the equipment.

SUMMARY OF THE INVENTION

The method and system according to the present invention are directed to aspects of the managerial problems facing a prospective or actual purchaser of industrial equipment. In a preferred embodiment, the present invention provides a method and system for providing purchaser access to services relating to the relocation of industrial equipment in connection with the sale, and preferably the on-line sale, of the equipment, and doing so in a manner that minimizes the activity required by the would-be purchaser of the equipment.

In accordance with an aspect of the present invention, a method for on-line marketing of services over a network to a prospective or actual purchaser of an item of industrial equipment, in which the services relate to either or both of the acquisition or use of the industrial equipment, comprises the following steps: providing to the purchaser over the network information relating to an on-line marketplace for industrial equipment, accepting over the network and storing in a database registration information from the purchaser, displaying over the network in conjunction with the on-line marketplace an identification of a plurality of services relating to the acquisition of industrial equipment, accepting over the network input from the purchaser identifying at least one of the plurality of services as to which the purchaser wishes to receive information, and transmitting to the purchaser information relating to the at least one service.

Another aspect of the present invention relates to a method for on-line marketing of services over a network to a prospective or actual purchaser of an item of industrial equipment, where the services relate to either or both of the acquisition or use of the industrial equipment. This method comprises providing an on-line marketplace for industrial equipment, accepting from the purchaser and storing in a database information relating to the identity of the purchaser, providing to the purchaser an identification of a plurality of services relating to the acquisition of industrial equipment, accepting input from the purchaser (the input identifying a selection of at least one of the plurality of services as to which the purchaser wishes to receive information), accepting input from the purchaser comprising information about the industrial equipment (the information being useful to the provider of the selected at least one service in preparing information for the purchaser), transmitting an identifying code to the provider of the at least one service (the identifying code serving to identify the purchaser), and receiving from the at least one service provider information relating to the purchasers request, the information transmitted in conjunction with the purchaser identification code.

According to another aspect of the present invention, a method for on-line marketing of services to a prospective or actual purchaser of an item of industrial equipment, where the services relate to either or both of the acquisition or use of the industrial equipment, comprises the following steps: providing to an on-line marketplace for industrial equipment information relating to the services, receiving from the on-line marketplace a code identifying the purchaser and information relating to the industrial equipment, and transmitting to the on-line service provider information responsive to the purchasers request, the information transmitted in conjunction with the purchaser identification code.

Another aspect of the present invention involves a method for use in an on-line marketplace for industrial equipment, in which prospective and actual purchasers of industrial equipment can select among a plurality of services relating to either or both of the acquisition and use of industrial equipment and request information relating to each selected service. The request for information may include information relating to particular industrial equipment that is the subject of an actual or prospective purchase. The method comprises generating a purchaser service request record comprising information representing the identity of the purchaser of industrial equipment, and including in the purchaser service request record a service indicator for each service selected by the purchaser, the service indicator being a function of the identify of each respective, selected service.

The present invention also relates to a method for on-line marketing of services to a prospective or actual purchaser of an item of industrial equipment, in which the services relate to either or both of the acquisition or use of the industrial equipment. The method comprises the steps of providing an on-line marketplace for industrial equipment, accepting and storing in a database purchaser registration information, providing an identification of a service relating to the industrial equipment, accepting input from a registered purchaser identifying its interest in receiving information relating to the service, accepting input from the purchaser relating to the equipment as to which services are to be rendered, assigning a code to the registered purchaser, accepting input from the purchaser indicating a request for an estimate of the price for the provision of services, transmitting to the provider of the at least one service information relating to the request for an estimate and information relating to the code assigned to the user and accepting from the at least one service provider information relating to the requested estimate.

Yet another aspect of the present invention relates to a system for on-line marketing of services to a prospective or actual purchaser of an item of industrial equipment, where the services relate to either or both of the acquisition or use of the industrial equipment. The inventive system comprises means for providing to the purchaser over the network information relating to an on-line marketplace for industrial equipment, means for accepting over the network and storing in a database registration information from the purchaser, means for displaying over the network in conjunction with the on-line marketplace an identification of a plurality of services relating to the acquisition of industrial equipment, means for accepting over the network input from the purchaser identifying at least one of the plurality of services as to which the purchaser wishes to receive information, and means for transmitting to the purchaser information relating to the at least one service.

Yet another aspect of the present invention is directed to a system for on-line marketing of services to a prospective or actual purchaser of an item of industrial equipment, the services relating to either or both of the acquisition or use of the industrial equipment. This system comprises means for providing an on-line marketplace for industrial equipment, means for accepting from the purchaser and storing in a database information relating to the identity of the purchaser, means for providing to the purchaser an identification of a plurality of services relating to the acquisition of industrial equipment, means for accepting input from the purchaser, the input identifying a selection of at least one of the plurality of services as to which the purchaser wishes to receive information, means for accepting input from the purchaser comprising information about the industrial equipment (the information being useful to the provider of the selected at least one service in preparing information for the purchaser), means for transmitting an identifying code to the provider of the at least one service (the identifying code serving to identify the purchaser) and means for receiving from the at least one service provider information relating to the purchasers request (the information transmitted in conjunction with the purchaser identification code).

A further aspect of the present invention entails a system for on-line marketing of services to a prospective or actual purchaser of an item of industrial equipment, wherein the services relate to either or both of the acquisition or use of the industrial equipment. This system comprises means for providing to an on-line marketplace for industrial equipment information relating to the services, means for receiving from the on-line marketplace a code identifying the purchaser and information relating to the industrial equipment, and means for transmitting to the on-line service provider information responsive to the purchasers request, the information transmitted in conjunction with the purchaser identification code.

An additional aspect of the present invention is a system for use in an on-line marketplace for industrial equipment, in which prospective and actual purchasers of industrial equipment can select among a plurality of services relating to either or both of the acquisition and use of industrial equipment and request information relating to each selected service, and wherein the request for information may include information relating to particular industrial equipment that is the subject of an actual or prospective purchase. This system comprises means for generating a purchaser service request record comprising information representing the identity of the purchaser of industrial equipment and means for including in the purchaser service request record a service indicator for each service selected by the purchaser, where the service indicator is a function of the identify of each respective, selected service.

A further aspect of the present invention is directed to a system for on-line marketing of services to a prospective or actual purchaser of an item of industrial equipment, in which the services relate to either or both of the acquisition or use of the industrial equipment. The system comprises means for providing an on-line marketplace for industrial equipment, means for accepting and storing in a database purchaser registration information, means for providing an identification of a service relating to the industrial equipment, means for accepting input from a registered purchaser identifying its interest in receiving information relating to the service, means for accepting input from the purchaser relating to the equipment as to which services are to be rendered, means for assigning a code to the registered purchaser, means for accepting input from the purchaser indicating a request for an estimate of the price for the provision of services, means for transmitting to the provider of the at least one service information relating to the request for an estimate and information relating to the code assigned to the user, and means for accepting from the at least one service provider information relating to the requested estimate.

BRIEF DESCRIPTION OF THE FIGURES

FIG. 4 shows a form for a user of the system according to the present invention to enter registration information, which in a preferred embodiment is a web page, but could be another form of electronic display.

FIGS. 7A and 7B show a flowchart setting forth logic associated with an embodiment of a method according to the present invention, the method being an alternative to the embodiment illustrated in FIGS. 6A–6C.

FIG. 8 shows a flowchart setting forth logic associated with another embodiment of a method according to the present invention.

DETAILED DESCRIPTION OF THE INVENTION

Figure 1:
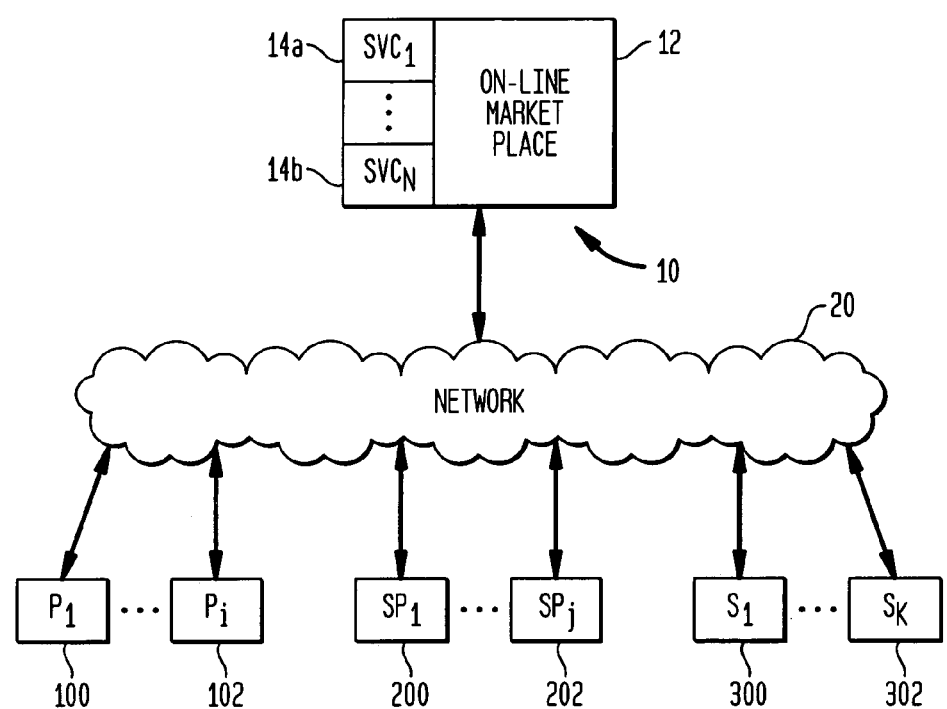
FIG. 1 shows a high-level view of an embodiment of the system according to the present invention and the environment in which the system according to the present invention resides.

The system and methods according to the present invention provide a mechanism for marketing and sales of services related to the purchase and use of industrial equipment. Through a cross-selling approach, services that include, without limitation, logistics services, payment services, on call services, instrument and tool services and financial services, are conveniently marketed and sold to prospective and actual purchasers of equipment for which such services may be required.

By way of a more detailed description of the sorts of services that can be marketed and cross-sold through use of the present invention, logistics services include services relating to the planning and organization of transport operations and transport-related logistics functions, i.e., transport management. Logistics services also can include the practical handling of shipments and export documentation. In the preferred embodiment, the different types of logistics services can be ordered as individual modules, or as a collection of services.

Transport management services include providing know-how relating to transport in a variety of geographic areas, as well as the planning and organization of transport projects. This includes planning and determination of technical and lowest-cost transportation/freight variations, clarification of local conditions and infrastructures and implementation of logistic concepts and problem solutions during the transport project.

Shipment and export handling services include timely management and handling of shipping and export procedures and consultation relating to export documentation handling, procedural specifics for each country, and export control, encompassing generation of required export documents. They also include planning and determination of the most cost-effective transport and packaging services and calculation and purchasing of freight and packing services.

Logistics services can also include transport network services. A service provider may have access to and a relationship with a network of forwarding agents, carriers, couriers, express service and parcel service carriers, as well as know-how and consulting competence involving such subjects as auditing of freight invoices, tracking and tracing, and offer services that take advantage of tools for the analysis and simulation of transportation networks.

Logistics service may also include the ability to calculate freight costs, including a tool for doing so on-line.

Effecting payment in an environment with unknown potential partners and service providers, as well as unfamiliar markets, presents a risk of bad debt losses. A provider of payment services, with special knowledge in this field, can reduce such risk, increase financial transparency of transactions and do so in a simple and cost-effective manner. In addition, payment services may preferably include information management relating to the financial status of parties to transactions, including information derived from database inquiries, such as reference numbers and credit ratings. The service can rely on local expertise of partners located in the same geographic region as the party whose financial status is in question, in order to provide an accurate assessment of that status.

Payment services may also comprise receivables management, which focuses on the handling of outstanding debt in order to effectuate the collection of payment while avoiding legal disputes or, if necessary, employing the necessary legal means to ensure collection.

On-call services seek to provide fast, reliable technical assistance worldwide to help assure operational availability of equipment.

Financial services are available to extend a variety of credit or leasing-based solutions to purchasers of equipment.

FIG. 1 shows the context in which an embodiment of the system 10 resides and in which the method is carried out. An on-line marketplace 12 serves as one or more exchanges (not shown) for industrial equipment. The term "industrial equipment" is generally used here to refer to equipment of a capital nature deployed in industrial settings, including without limitation automation equipment, drives and the like. The equipment bought and sold over the exchanges can be either new or used. The on-line marketplace 12 and its exchanges, which are implemented according to known methods, are accessible to prospective and actual purchasers ($P_1$ 100, . . . $P_i$ 102) and sellers ($S_1$ 300, . . . $S_k$ 302) over a network 20. The word "purchaser", as used herein, refers not only to actual purchasers of industrial equipment, but also to prospective purchasers of such equipment, even if the prospective purchaser never completes a purchase and does not contract for related cross-marketed services.

In the preferred embodiment of the present invention, network 20 is an internet, but in other embodiments it can be any type of data communication network. The system 10 is accessible over network 20 to a plurality of service providers ($SP_1$ 200, . . . , $SP_j$, 202). According to the present invention, service providers $SP_1$, 300, . . . , $SP_j$ 302 enter into agreements with an entity (not shown) controlling system 10, under which information relating to the network addresses of respective service providers $SP_1$, 300, . . . , $SP_j$ 302 is furnished, as is (in the preferred embodiment) descriptive information about their respective services $SVC_1$ 14a, . . . , $SVC_N$ 14b. A service provider SP can provide more than one of the services SVC (where N>j).

Figure 3:
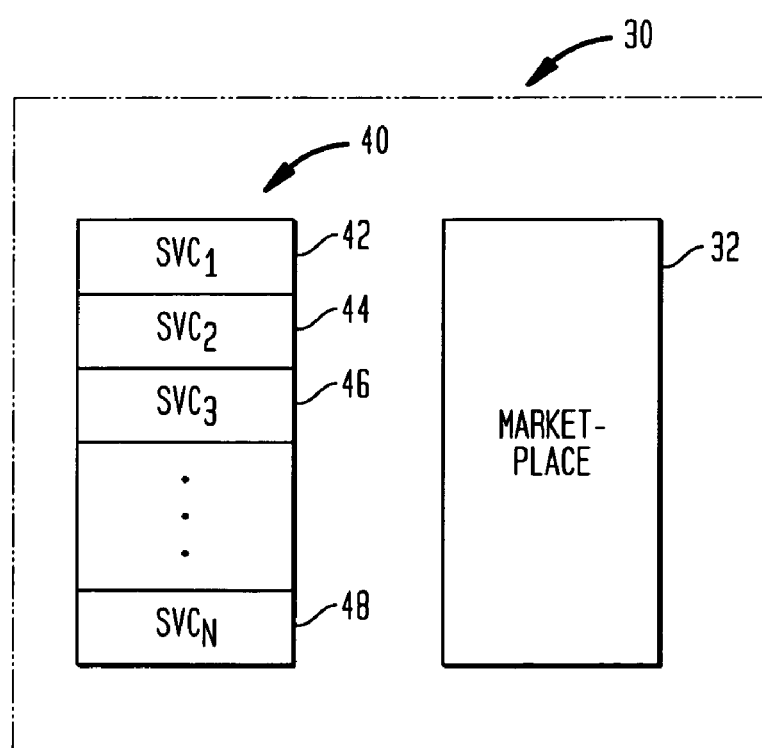
FIG. 3 shows in schematic form a computer display representing content generated by a system according to the present invention and in accordance with an embodiment of the method according to the present invention.

A preferred embodiment of system 10, at a conceptual level, comprises a web server 16, coupled to at least two databases 18a, 18b. In the preferred embodiment, but without limitation, one of the two databases comprises electronic documents, such as web pages, represented in a mark-up language such as the hypertext mark-up language ("html") html. The second database 18b in the preferred embodiment comprises a record of transactions, which can include those equipment transactions carried out over the exchanges, as well as usage transactions (e.g., comprising a record of the interactions of a given, registered visitor with the system 10). The primary example of a transaction recorded in database 18b, for purposes of the present invention, are interactions in which a purchaser, preferably a registered purchaser, sends input to the system 10 indicating an interest in one or more of the services $SVC_1$, . . . $SVC_N$. In the preferred embodiment of the invention, the entity that controls the system 10, per its agreement with service provider $SP_j$, provides one or more sets of information for purposes of user display, which in the preferred embodiment are web pages 30. A purchaser $P_i$ 102 that has visited the website of system 10 in order to pursue a prospective or actual purchase of industrial equipment is presented with a portion of the display 40 relating to a plurality of services, $SVC_1$ 42, . . . , $SVC_N$ 48. Information 40 is preferably a field of a screen-displayable document, such as a section of a document coded in the html, as shown in FIG. 3. In the preferred embodiment in that Figure, the portion of the display 40 is shown on a page that also includes descriptive information and/or one or more links to content 32 representing or relating to an on-line marketplace 12 for industrial equipment.

In the preferred embodiment of the invention, a purchaser $P_i$ 102 that happens to notice the portion of the display 40 devoted to cross-selling services $SVC_1$ 42, . . . , $SVC_N$ 48, and is interested in learning more about any of the services, must be a registered user of system 10 in order to successfully inquire about the cross-sold services $SVC_1$ 42, ..., $SVC_N$ 48.

Figure 2:
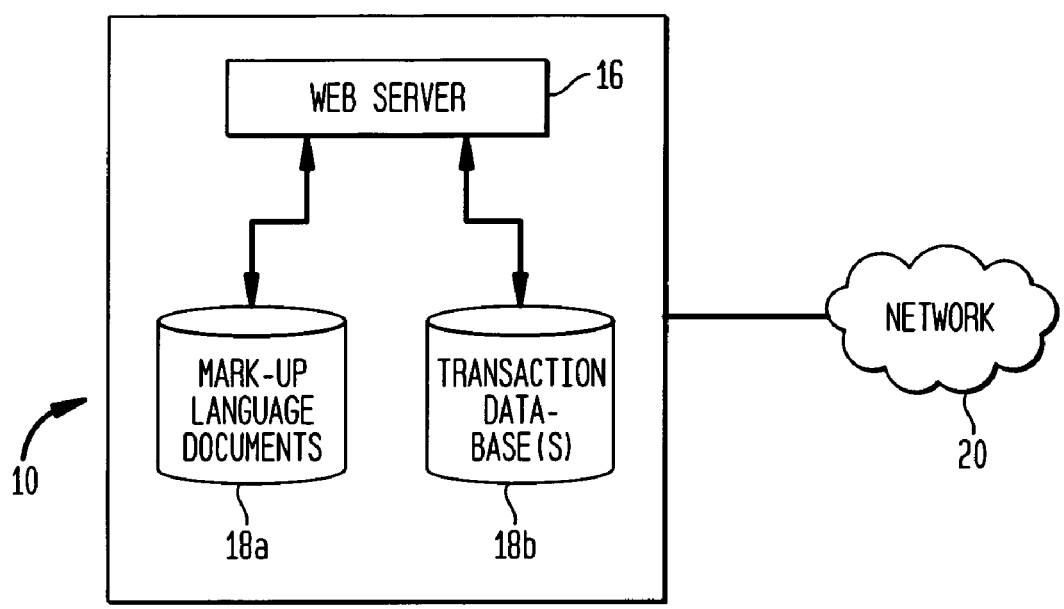
FIG. 2 shows in schematic form an embodiment of the system according to the present invention.

To do so in the preferred embodiment, the purchaser $P_i$ 102 navigates through the pages resident in database 18a served by web server 16 until the registration page is found. Referring to FIG. 4, a registration page, which is downloaded to purchaser $P_i$ 102 over network 20, requests a variety of identification information about the purchaser $P_i$ 102 and his/her employer, the type of user to be registered as, mailing address, email address, telephone and telefax information, and a user-selected user name and password. The purchaser $P_i$ 102 also checks an acknowledgement that he or she has read and agrees upon the terms of business set forth in other web pages available through web server 16 of system 10. A prospective or actual seller $S_k$ 302 would register through the same mechanism. When the information is entered and transmitted to the system 10, via its web sever 16, the information is loaded into a database, such as database 18b in FIG. 2.

Figure 5:
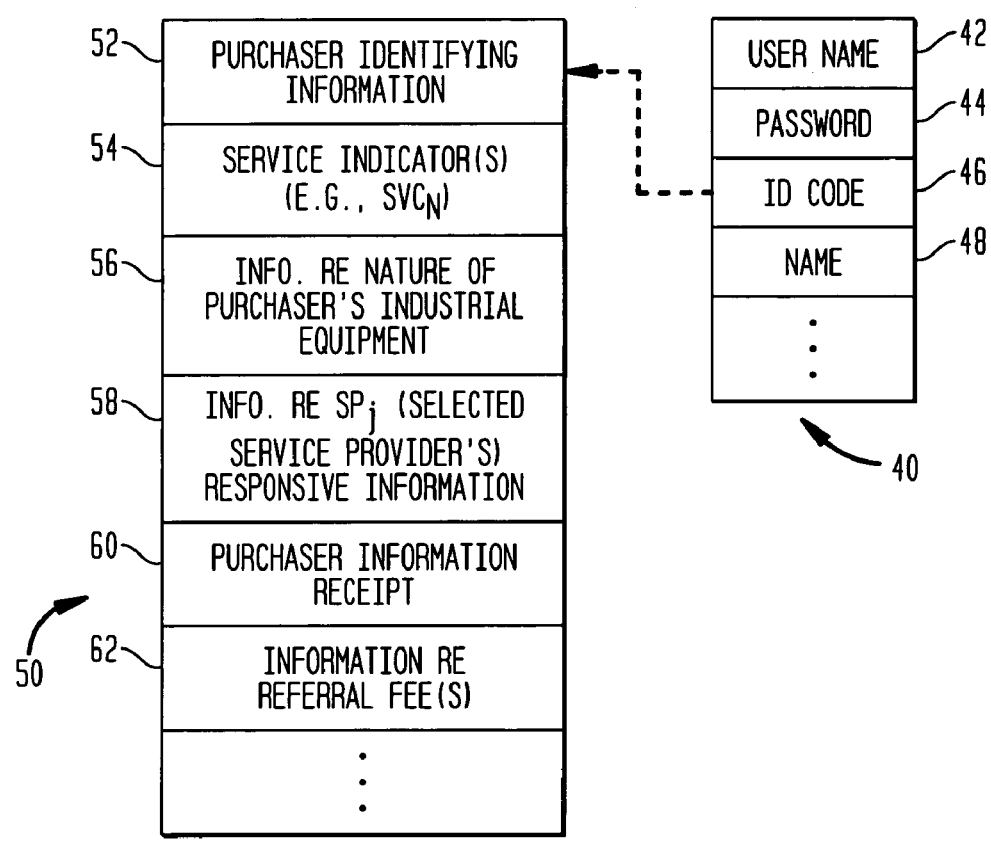
FIG. 5 is a conceptual representation of a database used in implementing the invention.

Referring to FIG. 5, a database 40 in a preferred embodiment of the present invention comprises a user name 42, password 44, an optional identification code 46, the purchaser's actual name 48, and the remainder of the information obtained through the registration form of FIG. 4. Database 40 can be stored among the transaction databases 18b of system 10, or another database (not shown). The ordering of fields in database 40 can be rearranged or modified by the addition on fields that are not shown, without departing from the present invention. A second database, that may be referred to as a purchaser service request database 50 holds information in accordance with an embodiment of a method of the present invention, as set forth in FIGS. 6A–6C. In particular, the purchaser service request database 50 in a preferred embodiment of the invention, includes records (of content as shown in FIG. 5) in which are stored purchaser identifying information 52 (which may include ID code 46, or a pointer to ID code 46, and could also include other identifying information stored in database 40. It includes a field 54 for storing one or more indicators of the service(s) SVCN in which purchaser Pi 102 has expressed interest. In addition, it includes fields for storing information relating to the nature of the purchaser's equipment and/or request for information (at reference numeral 56), information relating to responsive information received from the service provider $SP_j$ 202 (at reference numeral 58), information relating to the receipt by purchaser $P_i$ 102 of information from service provider $SP_j$ 202 (at reference numeral 60), and, optionally, information relating to a charge or fee (to be paid by the service provider) associated with either or both of the purchaser's selecting service provider $SP_j$ 202, or receiving information from service provider $SP_j$ 202, or actually receiving services from $SP_j$. 202 (at reference numeral 62). As with database 40, the order the fields in purchaser service request database 50 database 40 can be rearranged or modified by the addition of fields that are not shown, without departing from the present invention.

Figure 6A:
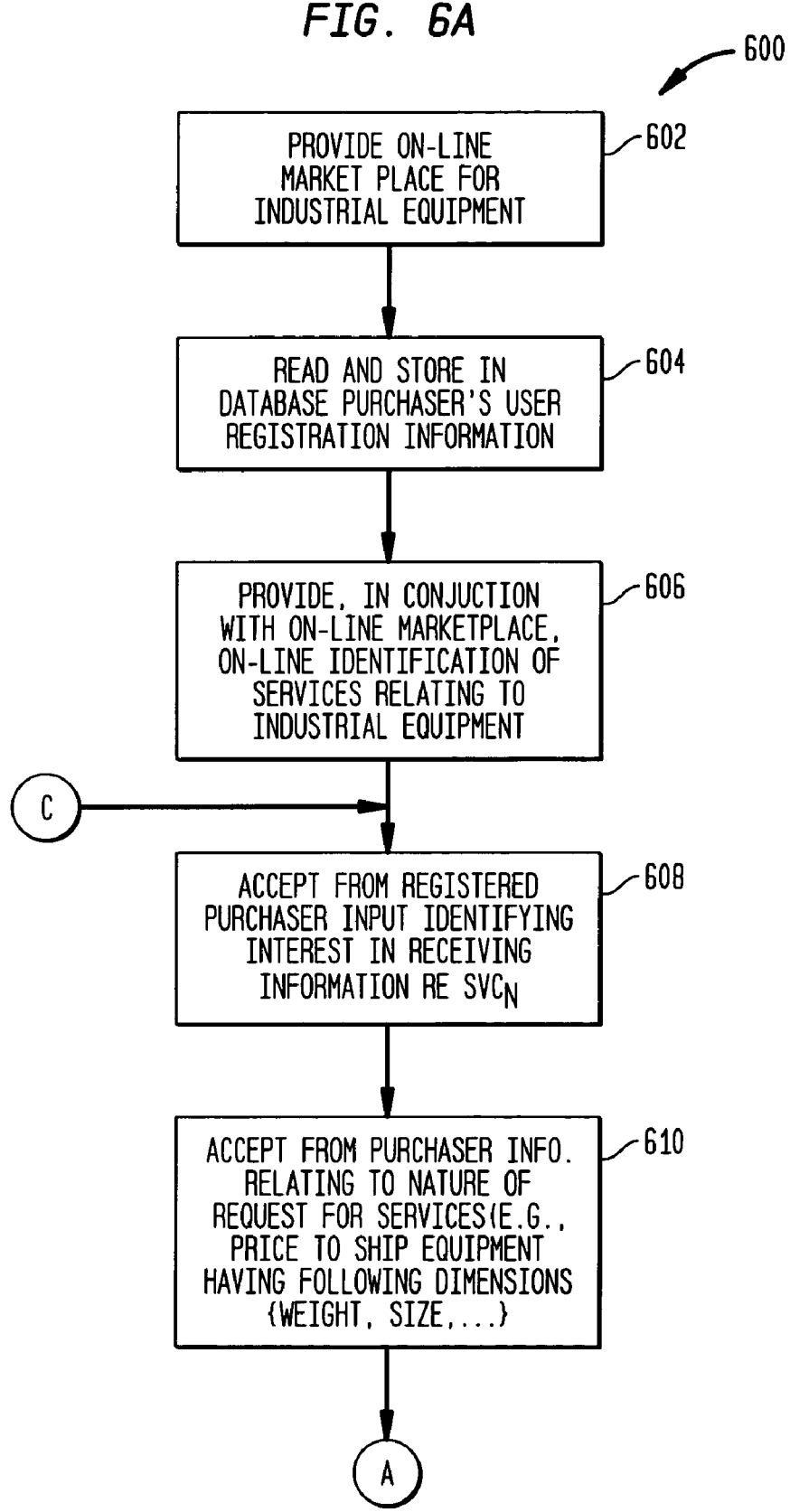
FIGS. 6A–6C show a flowchart setting forth logic associated with an embodiment of a method according to the present invention.
Figure 6B:
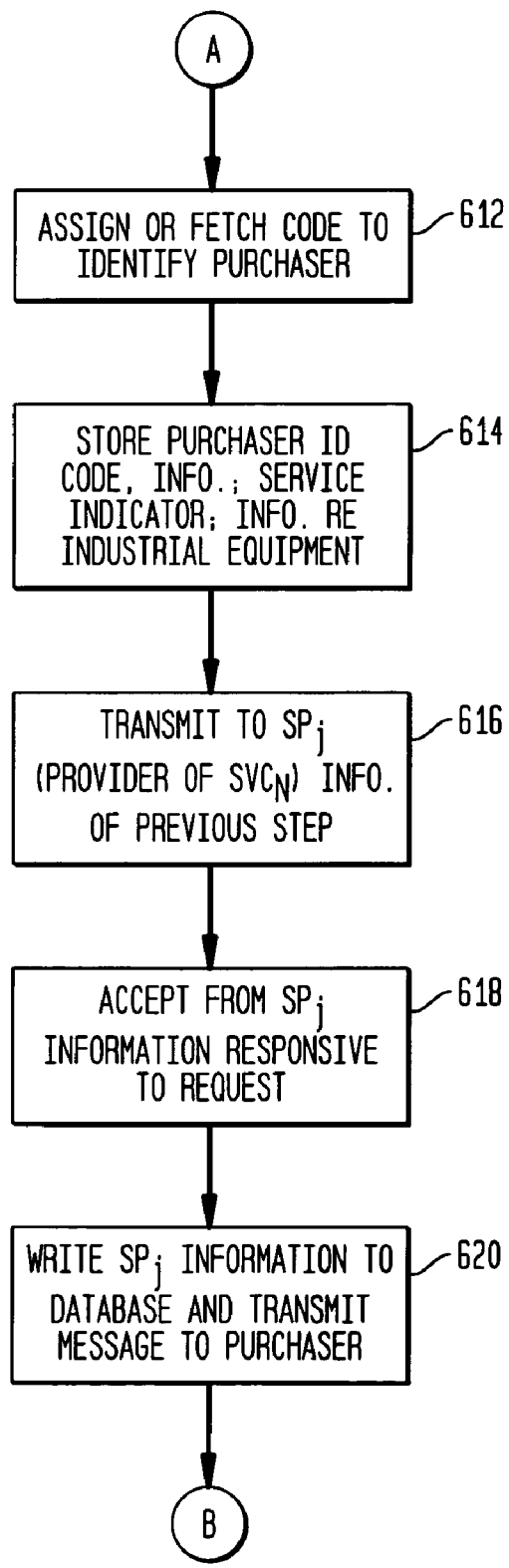
Figure 6C:
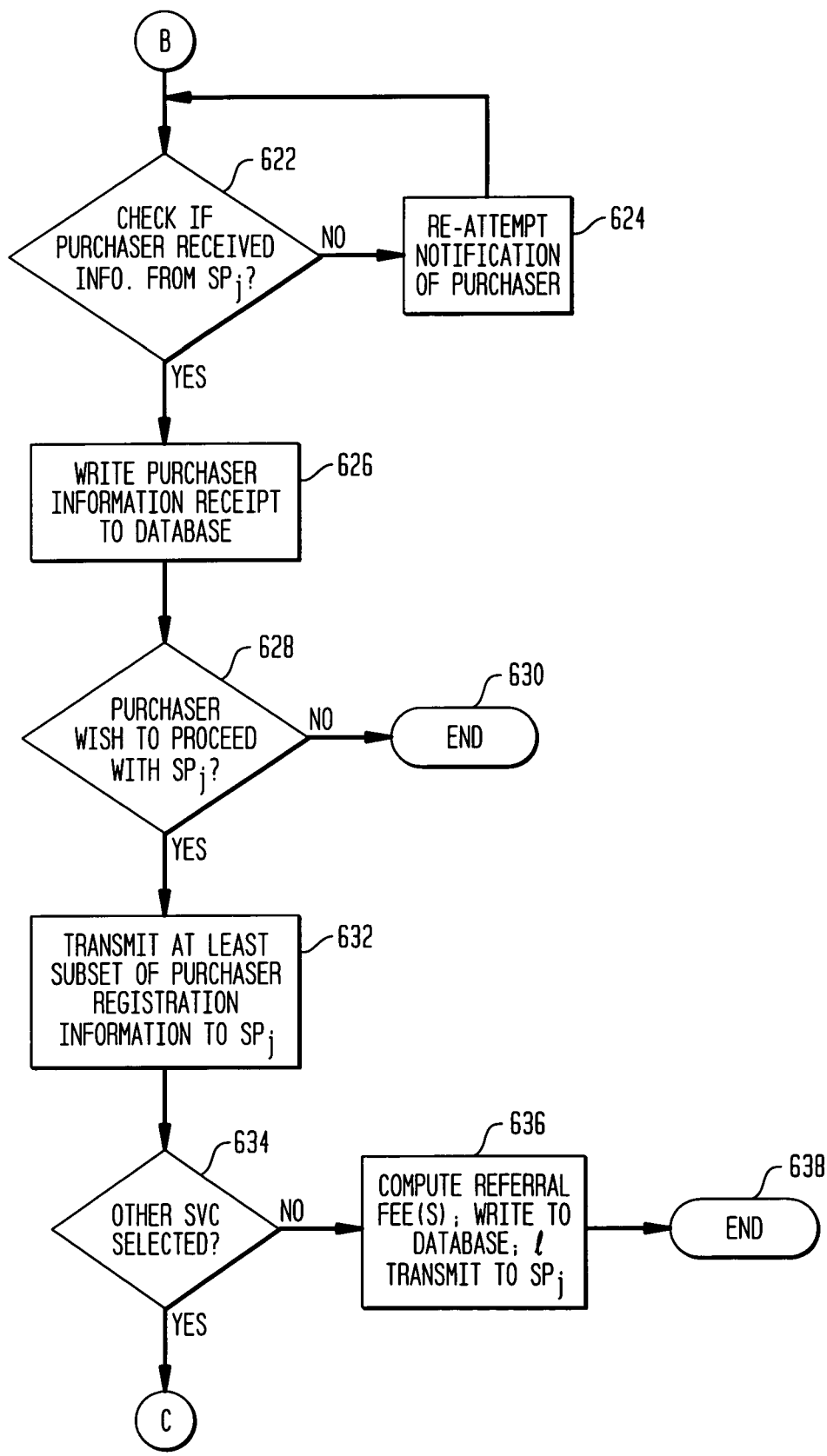

Referring to FIGS. 6A–6C, flowchart 600 shows, at a conceptual level, steps associated with a method according to the present invention. The exact ordering of the steps may be varied to achieve the same end of marketing and cross-selling a plurality of services relating to industrial equipment in the context of a system providing a marketplace for the exchange of such equipment. In addition, other intermediate steps not described here may be inserted without departing from the invention. In a preferred embodiment of a method according to the present invention, system 10 at step 602 provides an on-line marketplace for industrial equipment by providing the marketplace 12 via a website accessible over network 20, for example, the worldwide public internet. In other embodiments, other methods for accessing the offerings of system 10 over a network may also be employed. The on-line marketplace 12 is visited via network 20 by prospective and actual purchasers $P_1$ 100, ..., $P_i$ 102, and by prospective and actual sellers $S_1$ 300, ... $S_k$ 302, who can, respectively, either view information regarding, and make offers on, listed products, or, list its product(s) for sale.

At step 604, the system 10 reads and stores in a database, e.g., database 18b, information retrieved from the purchasers $P_1$ 100, ..., $P_i$ 102 (or sellers $S_1$ 300, ... $S_k$ 302) through the form of FIG. 4. The system 10, as shown at step 606, presents an identification of services relating to industrial equipment in conjunction with the on-line marketplace 12. As used here with respect to the preferred embodiment of the invention, the phrase "in conjunction with", refers to presentation of services 40 being presented on the same web page or, more generally, the same website, as either the on-line marketplace content 32 itself, or information relating to, or a hyperlink pointing to, the marketplace content 32.

Upon a purchaser $P_i$ 102 expressing interest in one or more of the services, e.g., $SVC_N$, by clicking, for example, on respective buttons 42–48 on the web page 30, and if the purchaser $P_i$ 102 is registered with system 10, the system accepts at step 608 information identifying such selected service(s) and stores the information in the purchaser service request record 50. The system 10, at step 610, also accepts from a purchaser information relating to the nature of a request for services (e.g., nature and dimension of the equipment, locations of origin and destination, and/or the like).

Continuing to FIG. 6B, system 10 at step 612 assigns an ID code to identify the purchaser, if one had not already been assigned, or retrieves an existing code from field 46 of database 40. At step 614, the service indicator accepted from purchaser $P_i$ 102 at step 608, some or all of the information accepted by the system 10 at step 610, and the ID code or other information relating to the code assigned or fetched at step 612, are stored in a record of the purchaser service request database 50, e.g, at fields 54, 52 and 56, respectively.

At step 616, system 10 transmits to service provider $SP_j$ 202 (e.g., via any known means including but not limited to sending an electronic mail message or serving a web page or a portion thereof) information including the purchaser identification code, the service indicator, and information regarding the equipment and the nature of the services in which the purchaser $P_i$ 102.

After the service provider $SP_j$ 202 has reviewed the information associated with the request (see step 806 of FIG. 7, described below) of purchaser $P_i$ 102 for information relating to services, system 10 at step 618 accepts from service provider $SP_j$ 202 information responsive to the request. System 10 writes this information, or a subset of it, at step 620, to purchaser service request database 50 and transmits a message (e.g., via any known means including but not limited to sending an electronic mail message or serving a web page or a portion thereof) to purchaser $P_i$ 102, who submitted the request, providing information regarding the response generated by service provider $SP_j$ 202.

Referring to FIG. 6C, system 10 checks at step 622 whether purchaser $P_i$ 102 was sent, or retrieved, the information received from SPj 202. If not, system 10 attempts again to notify purchaser $P_i$ 102 and control is returned to step 622. This notification-checking process may be set at the option of the administrator of system 10 to cycle a preselected number of times before the process ends when a purchaser notification cannot be verified (not shown). If, at step, 622 system 10 determines that purchaser $P_i$ 102 did, in fact, receive the requested information from service provider $SP_j$ 202, it writes an indication of this fact, at step 626, to the purchaser service request database 50 (see field 60, FIG. 5).

At step 628, system 10 checks whether the purchaser $P_i$ 102 has indicated that it wishes to proceed with $SP_j$ 202 to contract for the procurement of its services. If not, the method ends at 630; otherwise system transmits at least a subset of purchaser registration information to $SP_j$ 202 at step 632. The service provider $SP_j$ 202 can then establish communication directly with purchaser $P_i$ 102 in order to contract for and render services.

System 10 checks, at step 634, whether purchaser $P_i$ 102 had selected any other cross-marketed services. If so, control returns to step 608 (FIG. 6A); otherwise, at step 636, system 10 computes one or more referral fees based upon any mutual agreements between it and the service provider $SP_j$ 202, and writes them to a database, e.g., the purchaser service request database 50, at field 62, and transmits a message relating to the fee(s) to $SP_j$ 202, e.g., over network 20.

The information stored in purchaser service request database 50, evidencing that service provider $SP_j$ 202 received a request for information from purchaser $P_i$ 102, and also that it was able to generate and transmit a response to that query to purchaser $P_i$ 102, may optionally serve as the basis for calculating a referral fee (or other compensation) to the operator of system 10 in exchange for cross-selling the equipment-related services. Any such fee would be pursuant to the operative agreement(s) in place between the operator of the system 10, and each service provider $SP_j$ 202.

Figure 7B:
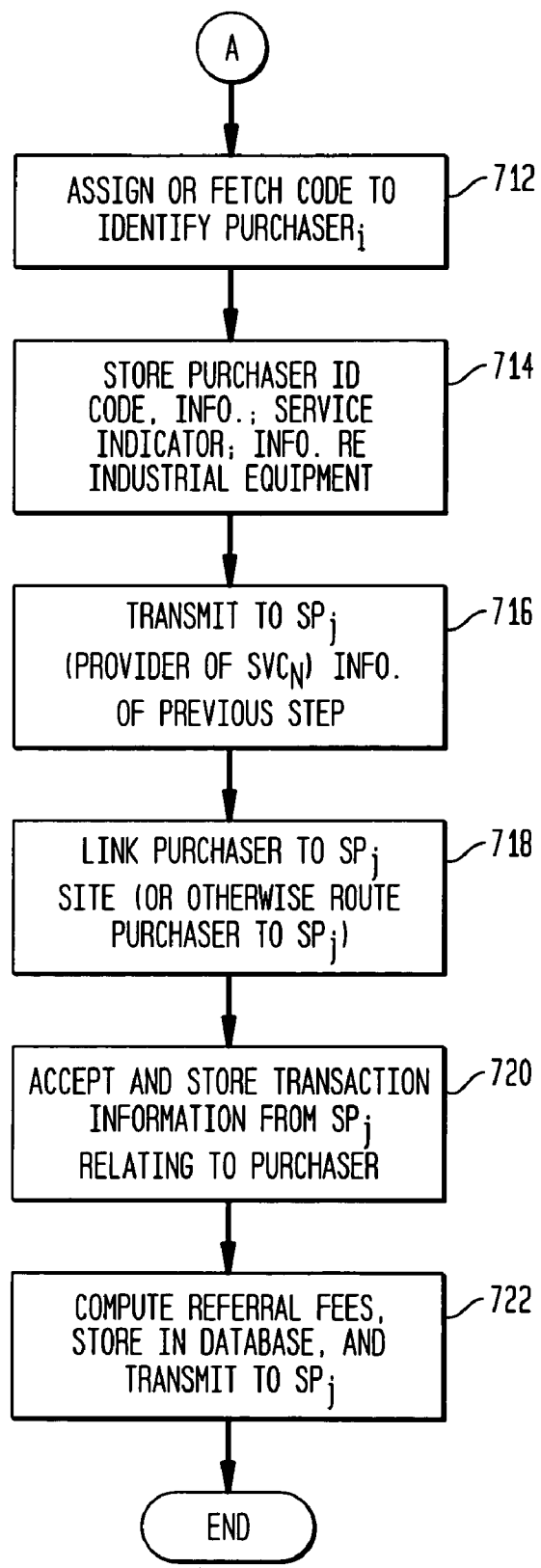

A second, simpler embodiment of a method according to the present invention is shown in FIGS. 7A and 7B. In those figures, like numbers refer to analogous steps in the embodiment of FIGS. 6A–6C. In FIGS. 7A and 7B, the method steps are identical to those of FIGS. 6A and 6B up to step 716. At step 718, however, rather than serve as an intermediary between the purchaser $P_i$ 102 and a selected service provider $SP_j$ 202, system 10 links or otherwise routes purchaser $P_i$ 102 to a website (or other information source accessible on-line) operated by $SP_j$ 202. The purchaser $P_i$ 102 and service provider $SP_j$ 202 then exchange information and may or may not contract for services. System 10 accepts from $SP_j$ 202 information relating to its being contacted by $P_i$ 102, and, preferably, any transaction entered into by them, and stores that information in purchaser service request database 50 (e.g., at field 60, purchaser information receipt and transaction field). System 10 then computes referral fee(s) based on the information received at step 720 and on the terms of any agreement(s) between the operator of system 10 and service provider $SP_j$ 102. System 10 then stores the referral fee information in purchaser service request database 50, preferably at field 62, and may then transmit at least a portion of that information to $SP_j$ 102.

Data stored in the purchaser service request database 50, such as the information relating to services requested, the nature of the equipment, the requested shipment and/or the nature of the requested services or information relating to the value of the services, and, if appropriate, information regarding the purchaser $P_i$ 102, may later be retrieved in whole or in part in order to (1) enable greater efficiency in the offering of future services, (2) enable the offering of particular benefits to the particular user based on the user's purchase history (e.g., to create an incentive for the user to continue to use System 10), or other purposes. For example, a user who invokes one or more of the cross-marketed services might accrue a value amount in the system, which could later be used toward the cost of future services or the cost of equipment purchased in the marketplace or other outcome of utility to the user.

In another embodiment of the present invention, a service provider $SP_j$ 202 employs a method of cross-selling of industrial equipment by invoking the services of a system 10 that delivers an on-line marketplace 12 for industrial equipment, and that provides, in conjunction with the on-line marketplace 12, information and links relating to services that could be of interest to acquirers of industrial equipment. Referring to FIG. 8, step 802, $SP_j$ 202 transmits to system 10 (e.g., over network 20) information indicating an interest in including its services among those being cross-marketed by the operator of system 10, and, optionally, additional information that could be included in system 10's website or other on-line service. At step 804, $SP_j$ 202 receives from system 10 information identifying purchaser $P_i$ 102 (as in FIG. 5, reference numeral 52), preferably in the form of an identifying code (as in FIG. 5, reference numeral 46). $SP_j$ 202 at step 804 also receives information regarding the request of purchaser $P_i$ 102 for information. Such information may comprise the particulars of industrial equipment to be purchased (e.g., its size, weight, and so forth), as well as the location of the equipment to be purchased and that of its destination.

Based on the purchaser information received, $SP_j$ 202 at step 806 generates information responsive to the request initiated by purchaser $P_i$ 102 and transmits it to system 10 to be accessed by purchaser $P_i$ 102. If, after receipt and review of the information generated by $SP_j$ 202, purchaser $P_i$ 102 remains interested in $SVC_N$ 14b provided by service provider $SP_j$ 102, $SP_j$ 202 at step 808 receives from system 10 at least a subset of purchaser registration information, which $SP_j$ 202 can then use at step 810 to establish contact (e.g., via e-mail or other means) with purchaser $P_i$ 102. This contact then may lead to the provision of service $SVC_N$ on behalf of purchaser $P_i$ 102. Pursuant to agreement with the operator of system 10, $SP_j$ 202 at step 812 transmits one or more messages to system 10 relating the nature and extent of contact with purchaser $P_i$ 102 and resulting transactions, which system 10 may use to assess referral fees or compute results useful for other purposes.

In addition to the embodiments of the aspects of the present invention described above, those of skill in the art will be able to arrive at a variety of other arrangements and steps which, if not explicitly described in this document, nevertheless embody the principles of the invention and fall within the scope of the appended claims.

What is claimed is:

1. A method for on-line marketing of services over a network to a purchaser of an item of industrial equipment, the services relating to the acquisition and/or use of the industrial equipment and coordinating the relocation thereof, the method comprising:
 providing an on-line marketplace including information relating to industrial equipment to the purchaser over the network;
 accepting information from the purchaser over the network and storing the information in a database registration;
 simultaneously displaying over the network the information relating to industrial equipment and at least two relocation services relating to the relocation of industrial equipment, the at least two relocation services provided by at least two different service providers;

accepting over the network input from the purchaser identifying relocation services relating to an industrial equipment purchase for which the purchaser wishes to receive information;

transmitting information to the purchaser relating to the relocation or acquisition services for the industrial equipment purchase over the network;

accepting information from the purchaser relating to the nature of the equipment for which relocation or acquisition services information is to be received; and transmitting information over the network to at least one of the relocation service providers, said information relating to the nature of the equipment for which relocation services are to be rendered.

2. The method according to claim 1, wherein the relocation services include logistics services.

3. The method according to claim 2, wherein the relocation services include transport management services.

4. The method according to claim 2, wherein the relocation services include shipment and export handling services.

5. The method according to claim 2, wherein the relocation services include transport network services.

6. The method according to claim 2, wherein the relocation services include freight calculation services.

7. The method according to claim 1, further comprising transmitting financing services information over the network to the purchaser.

8. The method according to claim 1, further comprising transmitting over the network on-call services information to the purchaser.

9. The method according to claim 1, further comprising transmitting over the network, to the purchaser, information related to instrument services.

10. The method according to claim 1, further comprising transmitting over the network, to the purchaser, information related to financial services.

11. The method according to claim 1, further comprising transmitting over the network, to the purchaser, services selected from the group of services consisting of logistics services, payment services, on call services, instrument services and financial services.

12. The method according to claim 1, further comprising the steps of:

accepting from at least one of the service providers responsive information intended for the user; and transmitting the information to the user;

wherein the information relating to the on-line marketplace comprises data reflecting actual transactions in the marketplace.

13. The method according to claim 1, wherein the information relating to the relocation services comprises network address information to permit the user to contact the at least two service providers over the network.

14. The method according to claim 1, wherein the information about the industrial equipment input by the purchaser includes information relating to a physical dimension of the equipment.

15. The method according to claim 1, wherein the information about the industrial equipment input by the purchaser includes information relating to the type of the equipment.

16. The method according to claim 1, wherein the information about the industrial equipment input by the purchaser includes information relating to the value of the equipment.

17. The method according to claim 1, further comprising accepting input from a user indicating a request for an estimate of the price for the provision of relocation services.

18. The method according to claim 17, further comprising the step of accepting from the at least one service provider information relating to the requested estimate.

19. The method according to claim 18, further comprising the step of presenting to the user at least a subset of the information from the service provider relating to the requested estimate.

20. The method according to claim 1, further comprising accepting an indication from the purchaser that its permission is given to transmit to the service provider comprising at least a subset of the information relating to the identity of the purchaser.

21. The method according to claim 20, further comprising transmitting to the at least one service provider the subset of the information relating to the identity of the purchaser.

22. A method for on-line marketing of services to a prospective or actual purchaser of a piece of industrial equipment, the services relating to the acquisition and/or use of the industrial equipment and coordinating the relocation thereof, the method comprising:

providing over a network to an on-line marketplace for industrial equipment information relating to industrial equipment and simultaneously displaying information related to at least two industrial equipment relocation services provided by at least two different service providers;

receiving over a network from the on-line marketplace a code identifying the purchaser and information relating to the industrial equipment;

transmitting over a network to the on-line service provider information responsive to a request from the purchaser, the information transmitted in conjunction with the purchaser identification code; and coordinating, over the network, relocation services for the industrial equipment.

23. The method according to claim 22, further comprising the step of receiving information relating to the identity of the purchaser.

24. The method according to claim 23, further comprising the steps of establishing contact with the purchaser and transmitting a message to the on-line marketplace relating to the contact with the purchaser.

25. A method for the on-line marketing of services relating to industrial equipment acquisition or use to a prospective or actual industrial equipment purchaser and coordinating the relocation thereof, the method comprising:

providing an on-line industrial equipment service marketplace including providing information related to the purchase of an item of industrial equipment and simultaneously displayng information related to at least two relocation services for relocating the industrial equipment, the relocation services provided by at least two different service providers;

accepting, from the purchaser, identifying information;

storing the purchaser identifying information in a database;

accepting, from the purchaser, input identifying selection of at least one of the relocation services regarding which the purchaser wishes to receive information;

accepting, from the purchaser, information concerning industrial equipment for which the at least one selected relocation service is sought;

transmitting a purchaser identification code, information concerning the at least one selected industrial equipment service and the industrial equipment information to at least one provider of the selected service;

receiving, from the at least one service provider, information responsive to the transmitted information; and transmitting to the purchaser the responsive information from the at least one service provider for purchaser consideration.

26. A system for providing the on-line marketing of services relating to industrial equipment acquisition or use to a prospective or actual industrial equipment purchaser and coordinating the relocation thereof, comprising:

means for providing an on-line industrial equipment service marketplace including providing information related to the purchase of an item of industrial equipment and simultaneously displayng information related to at least two relocation services for relocating the industrial equipment, the relocation services provided by at least two different service providers;

means for accepting, from the purchaser, identifying information;

means storing the purchaser identifying information in a database;

means for accepting, from the purchaser, input identifying selection of at least one of the relocation services regarding which the purchaser wishes to receive information and information concerning industrial equipment for which the at least one selected service is sought;

means for transmitting a purchaser identification code, information concerning the at least one selected relocation service and the industrial equipment information to at least one provider of the selected service;

means for receiving, from the at least one service provider, information responsive to the transmitted information; and means for transmitting to the purchaser the responsive information from the at least one service provider for purchaser consideration.

* * * * *